United States Patent [19]
Watanabe et al.

[11] Patent Number: 5,319,443
[45] Date of Patent: Jun. 7, 1994

[54] DETECTED POSITION CORRECTING METHOD

[75] Inventors: Atsushi Watanabe; Taro Arimatsu; Fumikazu Warashina, all of Yamanashi, Japan

[73] Assignee: Fanuc Ltd, Minamitsuru, Japan

[21] Appl. No.: 941,071

[22] PCT Filed: Feb. 28, 1990

[86] PCT No.: PCT/JP92/00241
§ 371 Date: Oct. 16, 1992
§ 102(e) Date: Oct. 16, 1992

[87] PCT Pub. No.: WO92/15838
PCT Pub. Date: Sep. 17, 1992

[30] Foreign Application Priority Data
Mar. 7, 1991 [JP] Japan .................................. 3-67981

[51] Int. Cl.$^5$ .............................................. G01B 11/00
[52] U.S. Cl. .................................... 356/375; 901/47
[58] Field of Search .................. 356/372, 375; 901/47

[56] References Cited
FOREIGN PATENT DOCUMENTS

| 59-142617 | 8/1984 | Japan . |
| 60-252914 | 12/1985 | Japan . |
| 62-226308 | 10/1987 | Japan . |
| 1-153907 | 6/1989 | Japan . |
| 99802 | 4/1990 | Japan . |

Primary Examiner—F. L. Evans
Attorney, Agent, or Firm—Staas & Halsey

[57] ABSTRACT

After a calibration process has been carried out once for a sensor with respect to a certain position, the position of an object can be detected by the sensor in any other positions, so that the object can positionally be detected in a wide range. Specifically, calibration data (CDA) (32) is produced by calibration process in a position A before a camera moves, and calibration data (CDB) (33) for the camera after it is moved is calculated based on distance data CM (12) with respect to the position and attitude of the camera (3). Then, the position of an object (30) is detected on the basis of the calibration data (CDB) (33) and image data (WDB) (31) of the object (30) imaged by the camera (3) which is in the position B.

5 Claims, 2 Drawing Sheets

DETECTED POSITION CORRECTING METHOD

DESCRIPTION

1. Technical Field

The present invention relates to a detected position correcting method for use in the detection by a sensor of the position of an object, and more particularly to a detected position correcting method for use in the detection of the position of an object by a visual sensor mounted on a robot hand.

2. Background Art

Some practical robotic systems incorporate a vision system for recognizing the position of objects during the process of assembling, palletizing, or otherwise processing the objects. One typical vision system comprises a visual sensor, e.g., a camera, mounted on a robot hand for imaging the objects. To detect the position of an object in such a robotic system, it is necessary for the robotic system to have predetermined information, i.e., calibration data, indicative of the position from which the visual sensor is viewing the object.

The calibration data is effective only with respect to the position and attitude of the visual sensor at the time the visual sensor is calibrated. Therefore, in use, the visual sensor is required to be completely fixed to the position in which it has been calibrated. Detection of the position of an object by a visual sensor mounted on a movable component such as a robot hand requires that the position and attitude of the visual sensor at the time of its calibration be reproduced and employed for accurate positional detection. As a result, the visual sensor is limited as to its position, and can detect objects only within a small range of view. When the position of an object to be detected by the visual sensor is shifted out of the visual range of the visual sensor, for example, the visual sensor can no longer detect the object.

Certain applications need the detection of a plurality of positions by a single visual sensor mounted on a robot hand. Since there are required as many calibration data as the number of positions to be detected, the process of calibrating the visual sensor involves many steps and requires a long period of time.

DISCLOSURE OF THE INVENTION

In view of the aforesaid difficulties of the conventional visual sensor calibration process, it is an object of the present invention to provide a detected position correcting method which can detect the position of the object in a wide range. Another object of the present invention is to provide a detected position correcting method which, after having calibrating a sensor once with respect to a certain position, can detect objects in other positions.

According to the present invention, there is provided a method of correcting data of an object detected by a sensor to determine a position of the object, comprising the steps of determining first calibration data according to a calibration process carried out between the coordinate system of a movable component and the coordinate system of a sensor mounted on the movable component, recognizing the position and attitude of the sensor before the sensor moves, when the calibration process is carried out, recognizing the position and attitude of the sensor after the sensor is moved by the movable component, determining a distance by which the position and attitude of the sensor has moved, from the positions and attitudes of the sensor before and after the sensor moves, determining second calibration data for the sensor after the sensor is moved, based on the distance and the first calibration data, and determining the position of the object based on the second calibration data and data of the object detected by the sensor after the sensor is moved.

The calibration process is carried out to determine first calibration data between the coordinate system of the movable component and the coordinate system of the sensor. The distance by which the position and attitude of the sensor has moved is determined based on the position and attitude of the sensor in the calibration process before the sensor moves, and also on the position and attitude of the sensor after the sensor is moved. The second calibration data for the sensor after it has moved is calculated from the determined distance and the first calibration data. The position of the object is then determined with accuracy based on the second calibration data and the data of the object detected by the sensor after the sensor is moved. Therefore, the calibration process is carried out only once to determine the first calibration data, and the second calibration data is determined by calculations for every position that the sensor may move to. Consequently, the sensor is not positionally Limited and can detect the position of the object in a wide range,

BRIEF DESCRIPTION OF THE DRAWINGS

FIG. I is a perspective view, partly in block form, of a robotic system for carrying out a detected position correcting method according to an embodiment of the present invention.

BEST MODE FOR CARRYING OUT THE INVENTION

Figure 1:
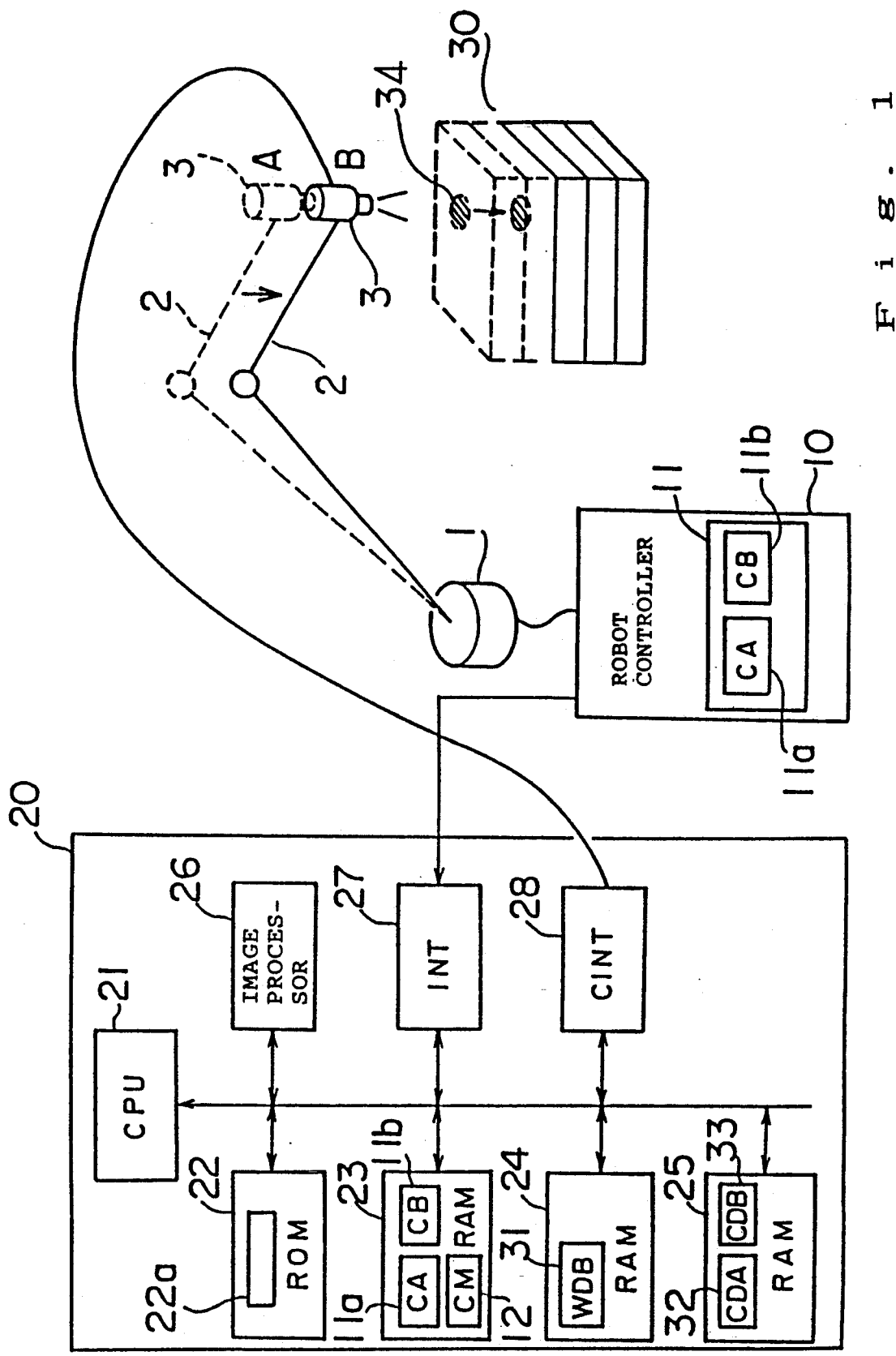

An embodiment of the present invention will hereinafter be described with reference to the drawings.

FIG. I shows, partly in block form, a robotic system as a whole for carrying out a detected position correcting method according to an embodiment of the present invention. The robotic system has a robot 1 controlled by commands from a robot controller 10. The robot 1 has an arm 2 with a camera 3 mounted as a visual sensor on its tip. The camera 3 is moved by the robot 1 from a broken-line position A to a solid-line position B. In each of the positions A, B, the camera 3 images a feature point 34 on an object 30, and sends the image data to a visual sensor controller 20. The positions A, B correspond to different steps of a palletizing process in which a working robot (not shown) successively removes Layers, from above, of the object 30. The camera 3 moves from the position A to the position B in order to image the feature point 34 on the upper surface of each layer of the object 30.

The robot controller 10 can recognize the position and attitude of the tip of the arm 2 of the robot 1, and has a memory 11 for storing data relative to the position and attitude of the camera 3 in each of the positions A, B. The data relative to the position and attitude of the camera 3 in the position A is referred to as data CA 11a, and the data relative to the position and attitude of the camera 3 in the position B is referred to as data CB 11b.

The visual sensor controller 20 has a processor (CPU) 21, a ROM 22 for storing a control program 22a for effecting a detected position correction method according to the present invention and a calibration process, a RAM 23 for storing the data (CA 11a, CB 11b) which are transferred from the robot controller 10 through an interface 27, a RAN 24 for storing image data (WDB) 31 that is produced when the camera 3 in the position B images the object 30 and transferred from the camera 3 through a camera interface 28, and a RAM 25 for storing calibration data (CDA) 32 which is generated by a calibration process when the camera 3 is in the position A, and also storing calibration data (CDB) 33 (described later). The calibration data (CDA) 32 is data for transforming a camera coordinate system into a common coordinate system. More specifically, image data produced by the camera 3 when the object 30 is imaged in the camera coordinate system by the camera 3 in the position A is corrected by the calibration data (CDA) 32, with the result that the position of the imaged object 30 can be recognized in the common coordinate system.

The processor 21 operates according to the control program 22a to control the robotic system in its entirety to determine the present position of the object 30 after it has moved. Such a process will be described below. First, an image processor 26 of the visual sensor controller 20 determines a distance data (CM) 12 by which the position and attitude of the camera 3 has moved, from the positional and attitude data (CA) 11a before the camera 3 moves, i.e., when the camera 3 is in the position A, and the positional and attitude data (CB) 11b after the camera 3 has moved, i.e., when the camera 3 is in the position B. The distance data (CM) 12 is stored in the RAM 23. Then, based on the distance data (CM) 12 and the calibration data (CDA) 32 stored in the RAN 25, the processor 21 determines calibration data (CDB) 33 after the camera 3 has moved, i.e., in the position B, and stores the determined calibration data (CDB) 33 in the RAM 25. The processor 21 thereafter determines the present position of the object 30 after it has moved based on the calibration data (CDB) 33 and the image data (WDB) 31, Specifically, the image data (WDB) 31 of the object 30 which is imaged by the camera 3 in the position B is corrected by the calibration data (CDB) 33 for the camera 3 in the position B, allowing the object 30 to be recognized in the common coordinate system.

As described above, the calibration data (CDB) 33 for the camera 3 in the position B is calculated from the calibration data (CDA) 32 that is produced by the calibration process before the camera 3 moves, i.e., when the camera 3 is in the position A, and also from the distance data (CM) 12, and the position of the object 30 is detected based on the calibration data (CDB) 33 and the image data of the object 30 imaged by the camera 3 in the position B. Accordingly, after the calibration process is carried out once to obtain calibration data, new calibration data can be calculated when the position and attitude of the camera 3 are changed. Therefore, new calibration data can be produced on the basis of the positional change for every position which the camera 3 may move to. The camera 3 is not Limited to any position, and can detect the position of the object 30 in a wide range. The position of the object 30 can be detected highly accurately as the calculated calibration data contains almost no errors.

In the above embodiment, the calibration data for the camera after it has moved is determined from the calibration data before the camera moves and the distance by which the camera has moved, and then the position of the object is determined from the determined calibration data for the camera after it has moved and the image data produced by the camera after it has moved. However, a temporary position of the object may be determined from the image data produced by the camera after it has moved and the calibration data before the camera moves, and the position of the object may be determined from the determined temporary position of the object and the distance by which the camera has moved, Specifically, the temporary position of the object is produced by correcting the image data produced by the camera after it has moved, which image data is regarded as the image data in the position before the camera moves, with the calibration data before the camera moves. The real position of the object is obtained by processing the temporary position to reflect the distance by which the camera has moved. The above alternative process simplifies the calculations needed to determine the position of the object.

Figure 2:
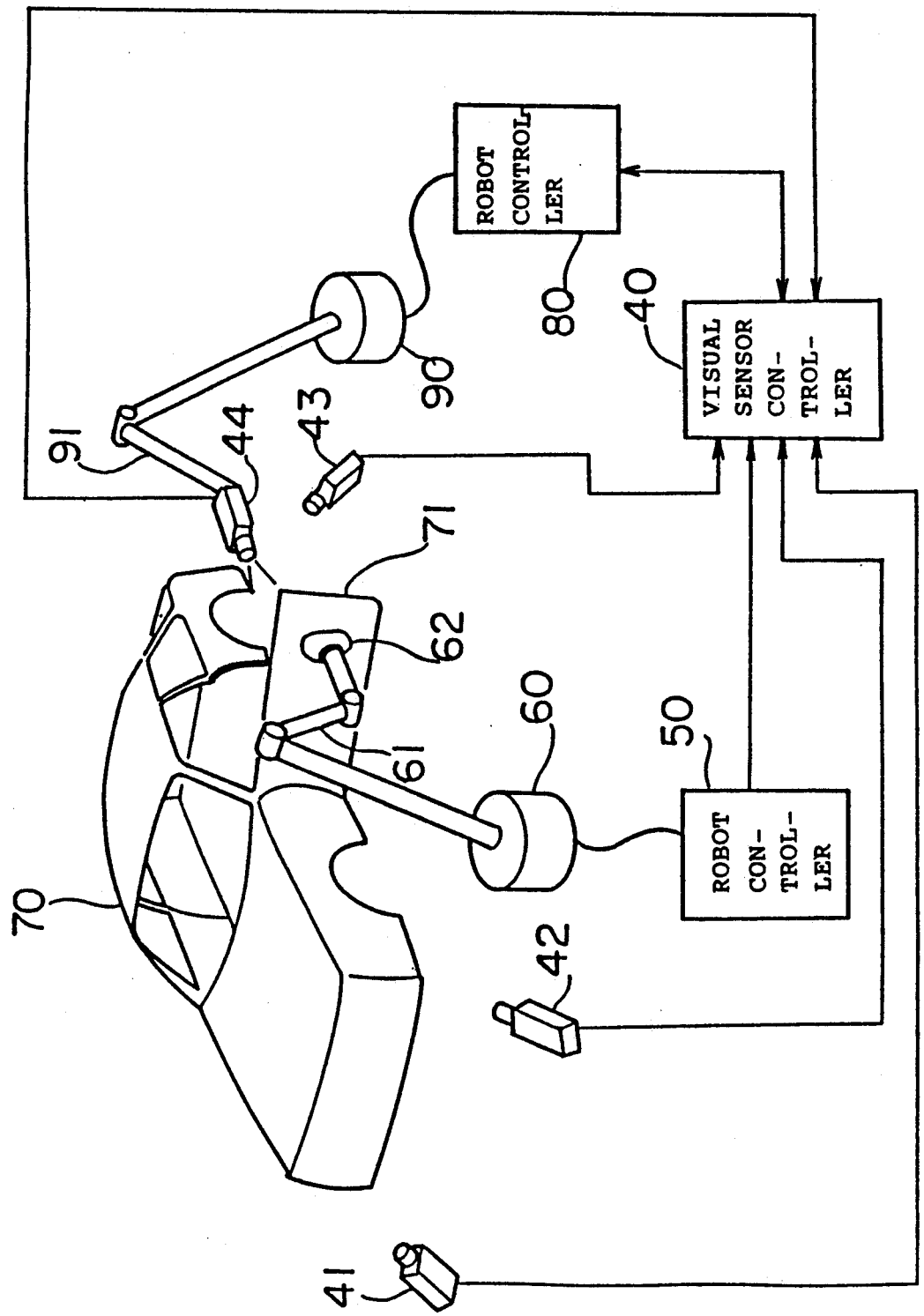
FIG. 2 is a perspective view, partly in block form, of a robotic system for carrying out a detected position correcting method according to another embodiment of the present invention.

FIG. 2 shows a robotic system for carrying out a detected position correcting method according to another embodiment of the present invention. The robotic system shown in FIG. 2 operates to enable a working robot (not shown) to accurately fasten bolts to a door 71 (object) of an automobile body 70 on an automobile production line. The automobile body 70 has three areas imaged by three cameras or visual sensors 41, 42, 43, respectively. A visual sensor controller 40 detects any positional displacement of the automobile body 70 based on the image data of the imaged areas of the automobile body 70°. The positional displacement information is transmitted from the visual sensor controller 40 to a robot controller 80. A robot 90 controls the position and attitude of the camera 44, which is mounted on the tip of an arm 91 of the robot 90.

A robot 60 has a robot hand 62 which opens the door 71 to a predetermined position under a command from the robot controller 50. At this time, the robot 90 moves the camera 44 based on the positional displacement information with respect to the automobile body 70 so that the camera 44 can view a predetermined area thereof in its visual range, The visual sensor controller 40 already has calibration data produced before the camera 44 moves. The visual sensor controller 40 detects the position of the door 71 according to the detected position correcting method of the present invention. More specifically, the visual sensor controller 40 determines calibration data after the camera 44 has moved, from the calibration data before the camera 44 moves and the distance by which the camera 44 has moved, and determines the position of the door 71 accurately based on the calibration data after the camera 44 has moved and the image data produced by the camera 44 after the camera 44 has moved. Based on the data thus determined of the position of the door 71, the non-illustrated working robot fastens bolts or the like to the door 71.

Therefore, in the event that the object, i.e., the door of the automobile body, is positionally displaced, such a positional displacement is detected, and the position and attitude of the camera is corrected on the basis of the detected positional displacement for positioning a feature point within the visual range of the camera. Accordingly, even when the object is positionally displaced, the object can be detected at all times with accuracy.

As described above, the calibration data for the sensor after it has moved is calculated from the calibration data that is produced before the sensor moves and also from the distance data that the sensor has moved, and the position of the object is detected based on the calibration data after the sensor has moved and the image data of the object imaged by the sensor after it has moved. Accordingly, after the calibration process is carried out once to obtain calibration data, new calibration data can be calculated when the position and attitude of the sensor is changed. Therefore, new calibration data can be produced on the basis of the positional change for every position which the sensor may move to. The sensor is not limited to any position, and can detect the position of the object in a wide range. The position of the object can be detected highly accurately as the calculated calibration data contains almost no errors.

A temporary position of the object may be determined from the image data from the sensor after it has moved and the calibration data before the sensor moves, and the position of the object may be determined from the determined temporary position of the object and the distance by which the sensor has moved. This arrangement is effective to simplify the calculations needed to determine the position of the object.

When the object is positionally displaced, the positional displacement is detected, and the position and attitude of the sensor is corrected based on the positional displacement to bring a feature point on the object into the visual range of the sensor. Consequently, the object can always be detected accurately even it is positionally displaced.

We claim:

1. A method of correcting data of an object detected by a sensor to determine a position of the object, comprising the steps of:

determining first calibration data according to a calibration process carried out between the coordinate system of a movable component and the coordinate system of a sensor mounted on said movable component;

recognizing the position and attitude of said sensor before the sensor moves, when said calibration process is carried out;

recognizing the position and attitude of said sensor after the sensor is moved by said movable component;

determining a distance by which the position and attitude of said sensor has moved, from the positions and attitudes of said sensor before and after the sensor moves;

determining second calibration data for said sensor after the sensor is moved, based on said distance and said first calibration data; and determining the position of the object based on said second calibration data and data of the object detected by said sensor after the sensor is moved.

2. A method according to claim 1, further including the steps of correcting an imaged position of said movable component depending on the position of the movable component detected by another sensor other than said sensor mounted on said movable component, and detecting a feature point of said object with said sensor mounted on said movable component, 3. A method according to claim 1, wherein said movable component comprises a robot, 4. A method according to claim 1, wherein said sensor comprises a visual sensor, 5. A method of correcting data of an object detected by a sensor to determine a position of the object, comprising the steps of:

determining first calibration data according to a calibration process carried out between the coordinate system of a movable component and the coordinate system of a sensor mounted on said movable component;

recognizing the position and attitude of said sensor before the sensor moves, when said calibration process is carried out;

recognizing the position and attitude of said sensor after the sensor is moved by said movable component;

determining a distance by which the position and attitude of said sensor has moved, from the positions and attitudes of said sensor before and after the sensor moves;

determining a temporary position of said object based on data of the object detected by said sensor after the sensor is moved and said first calibration data; and determining the position of the object based on said temporary position of the object and said distance.

* * * * *